(12) United States Patent
Wan et al.

(10) Patent No.: US 9,218,615 B2
(45) Date of Patent: Dec. 22, 2015

(54) AUTOMATED OPTIMIZATION OF AN ADVERTISEMENT PLACEMENT ENGINE

(71) Applicant: EBAY INC., San Jose, CA (US)

(72) Inventors: Howard Shi Kin Wan, San Jose, CA (US); Sudhir Mohan, Brisbane, CA (US); Ryan Sue, Brisbane, CA (US)

(73) Assignee: PAYPAL, INC., San Jose, CA (US)

( * ) Notice: Subject to any disclaimer, the term of this patent is extended or adjusted under 35 U.S.C. 154(b) by 32 days.

(21) Appl. No.: 13/926,731

(22) Filed: Jun. 25, 2013

(65) Prior Publication Data

US 2014/0337124 A1    Nov. 13, 2014

Related U.S. Application Data

(60) Provisional application No. 61/820,531, filed on May 7, 2013.

(51) Int. Cl.
   *G06Q 30/00* (2012.01)
   *G06Q 30/02* (2012.01)
(52) U.S. Cl.
   CPC ........ *G06Q 30/0277* (2013.01); *G06Q 30/0249* (2013.01)

(58) Field of Classification Search
   CPC .................................................. G06Q 30/0244
   USPC ...................................................... 705/14.43
   See application file for complete search history.

(56) References Cited

U.S. PATENT DOCUMENTS

| 7,627,515 B2 * | 12/2009 | Borgs et al. ..................... 705/37 |
| 2011/0219015 A1 * | 9/2011 | Kim et al. ..................... 707/768 |

* cited by examiner

*Primary Examiner* — John G Weiss
*Assistant Examiner* — Scott C Anderson
(74) *Attorney, Agent, or Firm* — Haynes and Boone, LLP

(57) ABSTRACT

A system and method for predicting a performance of a target advertisement placement via a simulation for optimum tuning is disclosed. A simulator receives a set of queries from a production engine, selects a subset of simulation queries from the queries by filtering, modifies query parameters as needed, transmits the simulation queries to the target engine for simulation, collects search results from the target engine, and computes a summary metric, which includes data fields retrieved from the search results and quantities calculated by using a prediction model derived from a production data warehouse. The simulator may further produce a simulation report, an indicator of performance prediction for the target engine, which comprises multiple metrics for the target engine, calculated with varying engine parameters.

21 Claims, 4 Drawing Sheets

| CLICK_MODEL | HOST | T_Q UERY | qs_con fig= | A_TIM E | A_SCO RE | A_P R D CT | A_MRC HT | A_DEAL | A_ECPC | A_ERPI | mD eal % | mPo s % |
|---|---|---|---|---|---|---|---|---|---|---|---|---|
| 0.0024\| 0.0018\| 0.0014\| 0.0012\| 0.0012\| 0.0010\| 0.0010\| 0.0008\| 0.0008\| 0.0004\| 0.0004\| 0.0002\| | phx-pkp2.sh opping.c om | 2000 | REF | 93.837 | 1561.1 | 0 | 5.2215 | 10.4465 | 1.77434 | 0.156746 | 100 | 100 |
| 0.0024\| 0.0018\| 0.0014\| 0.0012\| 0.0012\| 0.0010\| 0.0010\| 0.0008\| 0.0008\| 0.0004\| 0.0004\| 0.0002\| | phx-pkp2.sh opping.c om | 2000 | 0 | 90.963 5 | 1561.3 | 0 | 5.229 | 10.496 | 1.77198 | 0.156769 | 99.8 767 | 99.7 637 |
| 0.0024\| 0.0018\| 0.0014\| 0.0012\| 0.0012\| 0.0010\| 0.0010\| 0.0008\| 0.0008\| 0.0004\| 0.0004\| 0.0002\| | phx-pkp2.sh opping.c om | 2000 | 6 | 97.139 | 92127. 8 | 0 | 5.7115 | 11.356 | 1.78134 | 0.162383 | 94.6 882 | 83.7 974 |

FIG. 2

AUTOMATED OPTIMIZATION OF AN ADVERTISEMENT PLACEMENT ENGINE

REFERENCE TO RELATED APPLICATIONS

This application claims the benefit of U.S. Provisional Application No. 61/820,531, filed on May 7, 2013.

BACKGROUND

1. Field of the Invention

The present disclosure generally relates to the field of advertisement placement engines.

2. Related Art

In e-commerce, an advertisement placement engine delivers a list of deals or advertisements to a user. The deals may be selected from an inventory of hundreds of millions of deals from merchants. The selection criteria are based on the keywords, categories or a combination of keywords and categories entered by the user. When the user clicks or buys one of the deals, the engine is credited with a commission (or bid) from the merchant, which is known as a yield. A key performance objective is to optimize the yield, which can be achieved by optimizing two factors, namely, relevance and cost per click (CPC). Relevance represents the degree of how closely the search for deals matches the user's intent, and CPC represents how much bid from merchant can be obtained for the user selecting a particular deal. The higher the relevance, the higher the click through rate (CTR), and the higher the bid, the higher the CPC.

An advertisement placement engine has to balance the relevance with CPC, and in this respect, is different from a general purpose search engine that focuses on relevance only. The selection of deals by the engine starts with a relevance search, which retrieves a list of relevant deals based on keywords, categories, user profile, and any other information. In order to enhance the CPC, the bid in each deal is typically used to influence the final ordering of the deal list, using a re-ranking yield sort algorithm. For example, if two deals have similar relevance score, the engine may choose to place the deal with a higher bid value ahead. If the yield sort algorithm leans too much on the bid value, the relevance may suffer, which in turn would affect the CTR of the deals. To further complicate matters, the engine may further search deals across more merchants to give the customer better merchant selections. In this case, a merchant diversity algorithm is also used to demote finding deals from the same merchant.

The advertisement placement engine typically processes a user query in the following order: conduct a lexical match of keywords with deals in the corpus (a large collection of 100 million plus deals); pick the top 40,000 deals with the best lexical and static score; filter deals by using categories and user profile influence; re-rank deals based on a yield sort algorithm; and re-rank deals again based on a merchant diversity algorithm.

The typical methods used in the art to tune and optimize the engine are human judgment and the AB test, both of which have limitations. The method of human judgment uses a human judging process to deter mine the Normalized Discounted Cumulative Gain (NDCG) of a result set from a sample set of keywords sent to the target engine. The higher the NDCG, the higher the expected relevance. The human judgment process, however, is slow with the turnaround time for several thousands of queries being many hours or sometimes days, and expensive. With the typical cost to judge a query being about 0.4 dollars, the total cost could be very high when the testing requires judging thousands of queries. Further, in this method, the process cannot be automated, and greatly incurs development time.

On the other hand, the method of AB test channels a small percentage of the production traffic to the target engine, and measures the CTR and CPC. The higher the CTR and CPC produced by the target engine, the higher the expected CPC. The AB test, too, is slow, usually requiring days of testing to collect enough data to judge the CTR and CPC of the test, and expensive because the AB testneeds to expose part of the production traffic to an untested engine, which may directly impact the business negatively. Further, if the test result is not desirable, the development team may be left with little time to trouble shoot the problem and forced to cancel or delay the beta release. In that case, an additional step prior to the AB test is needed to predict the quality. Thus, each AB test takes a long time and incurs huge expenses and opportunity cost.

Therefore, it is desirable to provide a system and method to tune and optimize a target advertisement placement engine that is fast as well as inexpensive as compared to the conventional tuning tools.

BRIEF DESCRIPTION OF THE FIGURES

FIG. 2 is a simulation report of metrics for a target advertisement placement engine in an embodiment of the present disclosure;

DETAILED DESCRIPTION

Figure 1:
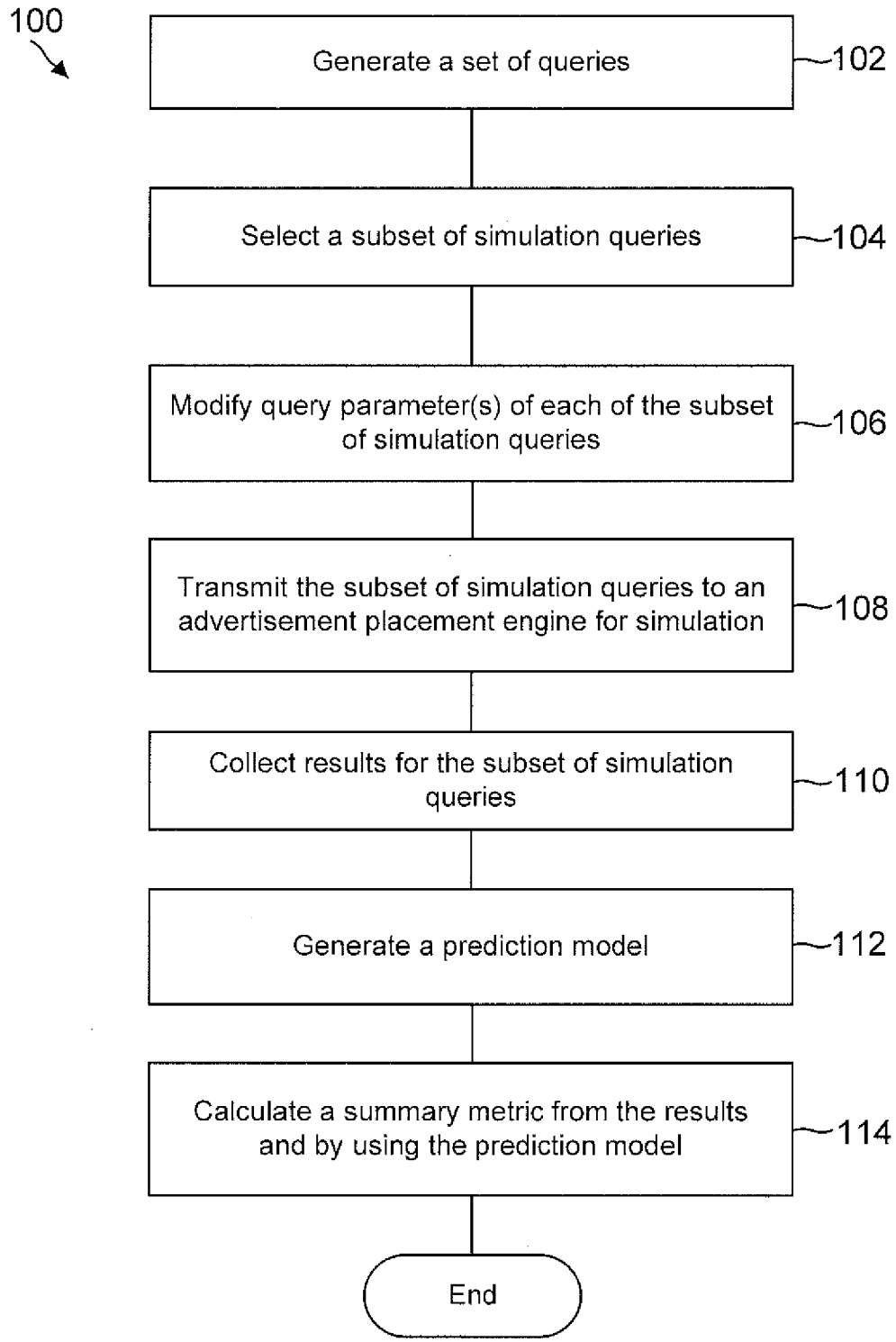
FIG. 1 is a flowchart showing a process for tuning and optimizing an advertisement placement engine by simulation in an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

The present disclosure provides a system and method to predict a performance of a target advertisement placement engine and thereby tune the engine via a production traffic simulator. The simulator leverages the production traffic and automates many of the tuning steps and better predicts the engine quality.

FIG. 1 is a flowchart showing a process 100 for tuning and optimizing an advertisement placement engine by simulation in an embodiment of the present disclosure. Note that one or more steps of the process 100 described herein may be omitted, performed in a different sequence, or combined as desired or appropriate.

The process 100, which can be performed by a simulator, starts with, at step 102, generating a set of queries for use to test and simulate the target engine. The set of queries may be generated, in an embodiment, by bringing a query log generated from a production ecommerce engine into the simulator. A production ecommerce engine, which serves search requests from an ecommerce web site, typically collects all the incoming production queries and log messages in a log file for diagnostic and analysis purposes. A query typically uses a HTTP protocol to transport the search request in an URL format. It consists of the keywords to search for and a collection of search parameters. The simulator may support other transport protocol and data format. A sample query searching for "men blue shoes" may be:

```
/?query=men+blue+shoes&country_id=1{_id=1&&nres_to_retriev
e=1500&apply_addon=0&nres_to_expose=5&&features=composer.xml(1
);filter.display-ind( );filter.bid( );filter.free merchants( ); filter.lang-
id( );filter.country-id( );filter.weight-
group( )&score_threshold=0.7&merchant_diversity_penalty_percent=16&
apply_discounts=0&static_rank_weight=0&qc_weighting=1&qc_banding
=0&qc_src_local=1&qc_src_remote=0#_accumulators=145000&ma
x_docs_to_check=5500000&max_post_time=500&yield_multiplier=0.2,
``` where the remaining name value pairs are search control parameters for the particular search engine. A pipeline may be constructed to stream production queries from the query log to the simulator. The simulator can choose to use the engine log currently existing or logs from previous days.

Once a set of queries is generated, then at step 104, the simulator may select a subset of simulation queries by filtering the set of queries for a simulation task under a user control. In doing so, the user may consider the spacing, sequencing, and type of the simulation queries. For example, the user can choose queries for a particular selected product line, or queries that use specific query parameters. For example, the user may be interested in queries that have "num_accumulators-145000" as one of the parameters.

In one embodiment, at step 106, to test new features or parameters, the parameter values of the simulation queries may be further modified before being transmitted to the target advertisement placement engine. The queries can be modified dynamically by a modifier in the simulator. For example, to study the effect of the "num_accumulators", the simulator may change the "num_accumulators" to a different value, such as "200000," and measure the results. At this step, more than one parameter can be modified at the same time.

Then at step 108, the subset of simulation queries selected by the filter is transmitted directly to the target engine for simulation. The target engine may be the same production engine that produced the simulation queries through the query log, a newer version of the same engine, or a different engine chosen for comparison with the production engine.

Still referring to FIG. 1, at step 110, the simulator collects the search results, called the target metrics, which are generated by the target engine for each of the queries. In an embodiment, the metric for a single query may consist of a product list, a merchant list, response time and deal list with associated bid value and ranking scores, typically, in a XML format. But depending on types of the engine, the results may take different data and/or be in different formats. The simulator in the present disclosure can be customized to parse different formats of search results and extract the needed data fields.

The process 100 in the present disclosure may further involve, at step 112, generating a prediction model from a production data warehouse, which is brought in to the simulator through a pipeline for using in the analysis and calculation of summary metrics. The production data are produced in a production environment, in which a production ecommerce engine (e.g., an advertisement placement engine of a production version) is serving search requests from ecommerce websites to generate all necessary user click and impression data to form production click data for business intelligence and account purposes. The click data may generally include: impression, representing how many times a deal is presented to a user; rank, representing the position of the deal whose value may be 1 to 25, assuming position 1 has the highest click through rate (CTR); click, representing how many times a deal is clicked; and sale, representing how many times the click results in a sale. For a given query, the production engine returns a search result, typically presenting a collection of deals in ranked order from position zero to position N. Typically, N equals 40, but may be much bigger. The deal of most relevance is placed at the top position. The deal of least relevance is placed at the bottom. The production data warehouse records the number of "impressions" and the number of "clicks" for a deal in each rank position for each day by the users.

The click model is formed by the simulator for use in analyzing query results from a target engine and computing summary metrics. The simulator or a device connected thereto collects various click data generated from the production engine through a click model pipeline, an offline process that is run by the simulator once per week or more frequently. The click model basically produces the "click probability" for a given position in the result set. The click model pipeline collects the click data comprising the impressions and clicks for a day range, such as 30 days, for calculating the "click probability" for each position, represented by a CTR at each deal position. The objective for obtaining the CTR at each deal position is to approximate the propensity of deal clicks at each deal position. If the target engine has the same relevance as the production engine, the CTR per deal position should be approximately the same. The CTR per deal position is calculated by sampling many days of deal "clicks" and dividing the collected "clicks" by "impressions." More specifically, the algorithm for calculating CTR at each deal position "p" may be as follows:

a. Collect all the deal impressions in the past N days,
    b. Calculate I(p), the "impressions" by their deal positions, for each group,
    c. Calculate DC(p), the "number of deal clicks," for each group, and
    d. Calculate CTR(p)=DC(p)/I(p).

The following table, Table I, is a sample CTR per deal position for the first 5 deal positions (N=5).

TABLE I

| Pos 1  | Pos 2  | Pos 3  | Pos 4  | Pos 5  |
|--------|--------|--------|--------|--------|
| 0.0024 | 0.0018 | 0.0014 | 0.0012 | 0.0012 |

Once calculated, the CTR at each deal position, or the deal_click_percentage, is stored as an array of size N, each representing the "click probability" of the corresponding rank position.

In an embodiment, using the CTR(p) found above, the click model may further calculate a relative CPC weight per position, CW(p), for a given deal at a given position may be:

a. Total CTR=CTR(1)+CTR(2)+ . . . +CTR(k), where k is the number of positions considered, and
    b. CW(p)=CTR(p)/Total CTR.

The click model may also collect, through its pipeline, the CTR of the deals in production in the past months. Every deal click at each position is recorded. Given that the production has millions of deal clicks each day, and the deals change daily, this is a large database and must be continuously updated by the pipeline. The click model may measure the popularity of a given deal by position. If the target engine returns more deals with higher CTR in the result set, more revenue will be generated. This is a better and more accurate click model than "CTR by position." However, it is not accurate if the deal coverage is low. For example, the "mDeal" metrics in the table shown above can be used to measure the coverage.

The click model described herein is only one example of many possible models. Different models for analyzing and calculating metrics can be derived per business needs and characteristics of the target engine.

With a particular click model obtained, then at step 114, the simulator computes a summary metric from the search results by using a particular click model. The summary metric includes predictions or indicators on the performance of the target engine, which comprise data fields extracted from each result or target metrics for each query and quantities calculated by using the particular click model. Different engines may have different formulas or different click models for calculating the summary metric for comparison. Table II below is an example summary metric calculated with the click model shown in Table I.

TABLE II

| A_Time | A_Score | A_Prdct | A_Mrcht | A_Deal | A_ECPC | A_ERPI | mDeal % | mPos % |
|---|---|---|---|---|---|---|---|---|
| 93.837 | 1561.11 | 0 | 5.2215 | 10.4465 | 1.77434 | 0.156746 | 100 | 100 |

'A_Time' is the average response time of the target engine per query. The smaller the value, the faster the engine is. The relevance and coverage of the target engine is impacted by how much time it is allowed to process a query. 'A_Score' is the average relevance score per deal per query. This score is generated by the target engine to calculate the relevance of a deal relative to the keywords. The higher the value, the better the predicted relevance is. How an engine calculates this number is depending on the design. In general, the factors used to calculate the score may include one or more of the: static rank of the deal, number of keywords matching the deal title, number of keywords matching the description, number of keywords matching the title, how many deals are checked for the search, number of accumulators to use for ranking, and how much time is allowed to perform the search. By carefully controlling the simulation parameters, the simulator can track this 'A_Score' and predict the expected relevance based on the difference between the production and target engine. 'A_Prdct' is the average product count per query. This number provides sight of products and deals mixing ratios. 'A_Mrcht' is the average merchant count per query. The higher the value, the more diversified the merchant mix. 'A_Deal' is the average deal count per query. This value has many implications. The higher the number, the better the recall rate is.

'mDeal %' is the percentage of deal names that match the names from the production engine, regardless of position, for the same query. This value, together with the 'mPos %,' is used to predict the similarity of two engines. Sometimes, it is used to track the ranking differences caused by different yield sort formulas or diversity penalty. 'mPos %' is the percentage of deal names that match the names from the production engine, both in name and position, for the same query. This number predicts how similar the target engine is to the production engine. For example, if the value is 100%, we can assume that the two engines have the same relevance.

'A_ECPC' is the average expected CPC per query, calculated by using the click model from a production engine. This value predicts how much revenue will be generated per user click. The higher the value, the better. This value can be used to track the merchant bid trend. For example, if the merchant bids higher in general, 'A_ECPC' will be increased also. 'A_ERPI' is the average revenue per impression per query, averaged across all queries, calculated by using the same click model. This value predicts the expected revenue per impression. The higher this value, the more revenue is expected.

The following shows how 'A_ECPC' and 'A_ERPI' in Table II can be calculated from the click model shown in Table I. Note that this particular calculation is given only by an example in one embodiment. With different click models in other embodiments, the formula for the calculation may change.

| Calculating Expected CPC per query |
|---|
| set deal_click_percentage[i] = the click probability at position 'i', derived from the "CLICK MODEL"; <br> set cur_deal_discount_bid = 0; <br> set cur_deal_click_percentage_total=0; |

-continued

| Calculating Expected CPC per query |
|---|
| Read the bid value of each deal in the result set starting from rank position i=0 to i=N; <br> set fdealBid = bid value of the current position; <br> cur_deal_discount_bid = cur_deal_discount_bid + (fdealBid X deal_click_percentage[i]) ; <br> cur_deal_click_percentage_total = cur_deal_click_percentage_total + deal_click_percentage[i]; <br> Expected CPC = cur_deal_discount_bid / cur_deal_click_percentage_total |

'A_ECPC' is obtained by averaging the Expected CPC across all queries in the current simulation. Similarly, 'A_ERPI' can be obtained by averaging the "cur_deal_discount bid" across all queries.

In an embodiment, the simulator may further repeat the steps 108, 110, and 114 of transmitting the simulation queries, collecting results for the simulation queries, and computing a summary metric, respectively, for different engine parameter values of the advertisement placement engine, but for the same given click model, and then create a simulation report. The simulation reports are usually produced in CSV, text, or XML format for easy downstream consumptions.

FIG. 2 is such a simulation report created, consisting of three metrics, generated by the simulator for a target advertisement placement engine in an embodiment. The first row, which is identical with the one of Table II, represents the metric from a production engine with a test batch of 2000 queries, which is used as a reference target engine. Accordingly, the values of 'mDeal %' and 'mPos % are 100% each.

The second and the third rows are metrics from development engines for different values of engine parameters, called "qs_config." The values are set to be 0 and 6 respectively. The second column lists CTR per deal position for 12 positions (N=12) obtained from the same click model for the Table II presented above. Note that the simulation report in FIG. 2 represents only an example for a particular target engine. Other reports with different metrics can be generated with different engine and/or business requirements.

The method described herein for tuning and optimizing an advertisement placement engine via a simulator can be applied to various areas of ecommerce advertisement placement engine development, such as: for simulating the behavior of the target engine under real production work load; for comparing the target engine's metrics against that of a production engine; for measuring the metrics variations and improvements; for tuning all tunable parameters towards a specific business goal; for providing diagnostic information when the target engine behaves incorrectly; and for validating the target engine prior to beta or production releases.

The method in the present disclosure also has many advantages over the methods of human judgment or AB test. Since it does not rely on human judgment to predict the relevance of an engine, but instead, measures the engine's internal relevance metrics for predictions, it makes the tuning much faster, e.g., in minutes instead of hours or days as with the conventional tools used in the current art. It allows, by utilizing simulation, various engine control parameters to be modified incrementally and dynamically. The method also produces a much better prediction, because the tuning can be done using hundreds of thousands of production queries, and can simulate the production traffic's query mix and spacing, which results in a more precise prediction than the traditional tuning method.

Figure 3:
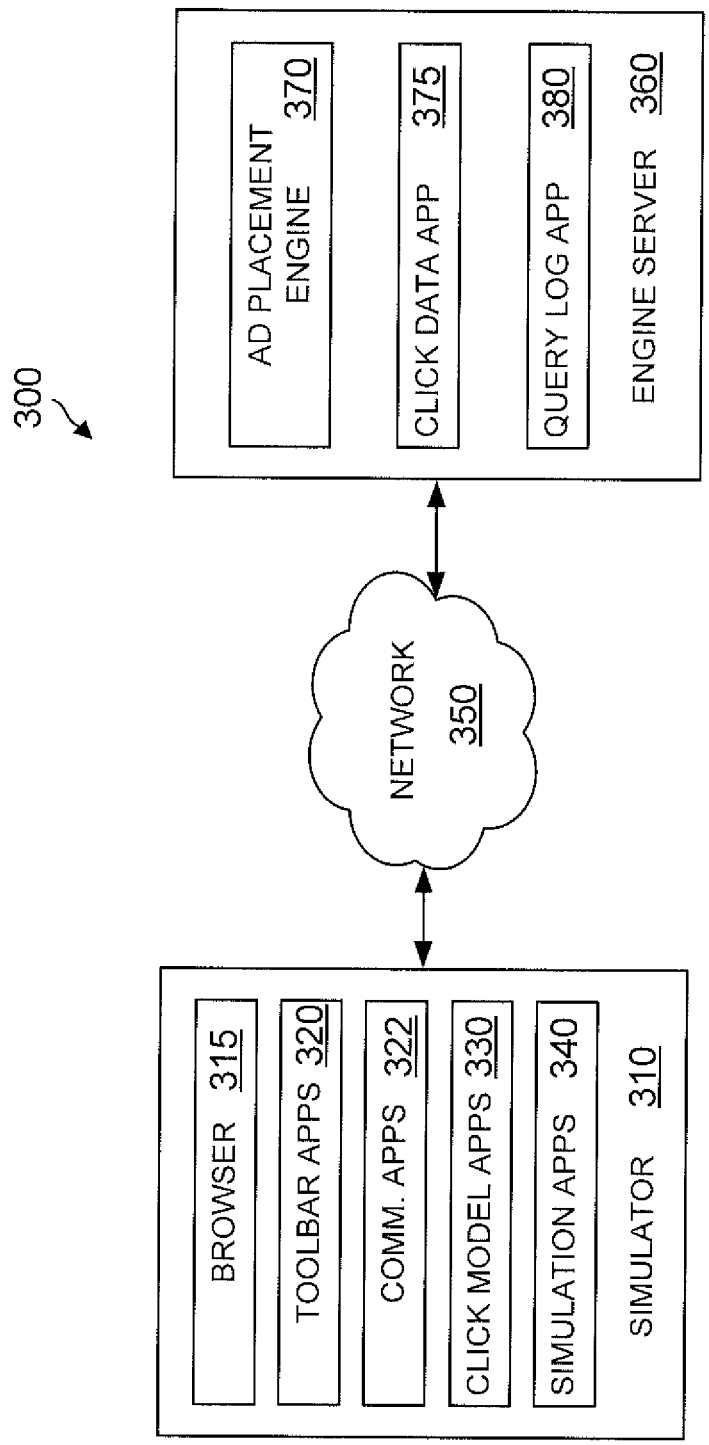
FIG. 3 is a block diagram of a networked system configured to handle a transaction, such as described above, in accordance with an embodiment of the invention.

FIG. 3 is a block diagram of a networked system 300 configured to handle a process, such as described above, in accordance with an embodiment of the invention. The simulator 310 described herein is appropriately configured to handle various processes in accordance with an embodiment of the invention. The simulator may include one or more processors, memories, and other appropriate components for executing instructions such as program code or instructions to implement the various applications, data, and steps described herein. For example, such instructions may be stored in one or more computer readable media such as memories or data storage devices internal and/or external to various components of the simulator, and/or accessible over network 350. The network 350 may be implemented as a single network or a combination of multiple networks. For example, in various embodiments, the network may include the Internet or one or more intranets, landline networks, wireless networks, and/or other appropriate types of networks. The simulator 310 may be implemented using any appropriate hardware and software configured for wired and/or wireless communication over the network 350.

The simulator 310 may include one or more browser applications 315, which may be used, for example, to provide a convenient interface to permit a user to browse information available over network 350. For example, in one embodiment, the browser application 315 may be implemented as a web browser configured to view information available over the Internet or access a website. The simulator 310 may also include one or more toolbar applications 320, for example, to provide client-side processing for performing desired tasks in response to operations selected by user. In one embodiment, the toolbar application 320 may display a user interface in connection with browser application 315. A communications application 322, with associated interfaces, may enables the simulator 310 to communicate within system 300.

The simulator 310 may further include an advertisement engine simulation application 340 configured to: fetch a query set from a production engine 370 in the server 360 via a pipeline through the network 350; generate a subset of simulation queries; transmit the subset of simulation queries to the advertisement placement engine, which may be either running on the simulator 310 or the engine server 360 for simulation; collect search results to the simulation queries from the advertisement placement engine; and compute a summary metric(s) from the query results by using a prediction model. The simulator 310 may further include an click model application 330 that generates a prediction model from a production data warehouse fetched from a production engine in the engine server 360 via a pipeline through the network 350. The applications 330 and 340 may be further configured to other steps described herein.

The engine server 360 may include an advertisement placement engine 370 either or both of the production version or target version. The engine server 360 may also include a query log application 380 that creates and maintains logs for queries requested from websites or users, which can be fed to the simulator 310 through the network 350. The engine server 360 may further include a click data application 375, which, in response to search requests (queries) from ecommerce websites, generates all necessary user click and impression data to form production click data, which can also be fed to the simulator 310 through the network 350.

Figure 4:
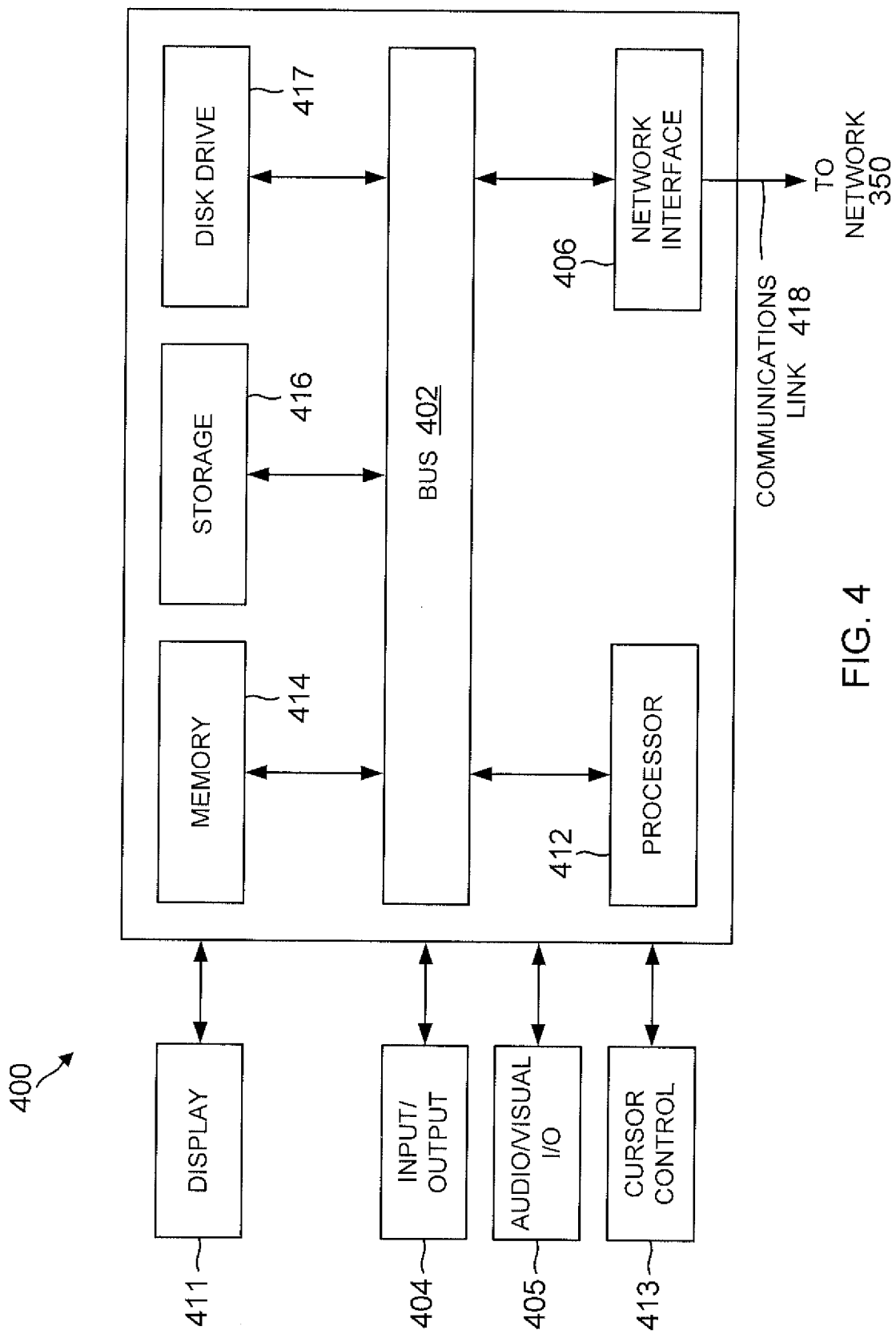
FIG. 4 is a block diagram of a system suitable for implementing one or more embodiments of the present disclosure.

FIG. 4 is a block diagram of a system, a simulator 400, suitable for implementing one or more embodiments of the present disclosure. The simulator 400 includes a bus 402 or other communication mechanism for communicating information data, signals, and information between various components of the simulator 400. Components include an input/output (I/O) component 404 that processes a user action, such as selecting keys from a keypad/keyboard, selecting one or more buttons or links, etc., and sends a corresponding signal to the bus 402. The I/O component 404 may also include an output component, such as a display 411 and a cursor control 413 (such as a keyboard, keypad, mouse, etc.). An optional audio input/output component 405 may also be included to allow a user to use voice for inputting information by converting audio signals. The audio I/O component 405 may allow the user to hear audio. A transceiver or network interface 406 transmits and receives signals between the simulator 400 and other devices, such as a server running an advertisement placement engine and/or a production engine via network 360. In one embodiment, the transmission is wireless, although other transmission mediums and methods may also be suitable. A processor 412, which can be a micro-controller, digital signal processor (DSP), or other processing component, processes these various signals, such as for display on the simulator 400 or transmission to other devices via a communication link 418. The processor 412 may also control transmission of information, such as cookies or IP addresses, to other devices.

Components of the simulator 400 also include a memory component 414 (e.g., RAM), a static storage component 416 (e.g., ROM), and/or a disk drive 417. The simulator 400 performs specific operations by processor 412 and other components by executing one or more sequences of instructions contained in the memory component 414. Logic may be encoded in a computer readable medium, which may refer to any medium that participates in providing instructions to the processor 412 for execution. Such a medium may take many forms, including but not limited to, non-volatile media, volatile media, and transmission media. In various implementations, non-volatile media includes optical or magnetic disks, volatile media includes dynamic memory, such as the memory component 414, and transmission media includes coaxial cables, copper wire, and fiber optics, including wires that comprise the bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by the simulator 400. In various other embodiments of the present disclosure, a plurality of the simulators 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although the description above contains much specificity, there should not be construed as limiting the scope of the present invention but as merely providing illustrations of some of the embodiments. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure, which should be determined by the appended claims and their legal equivalents, rather than by the examples given.

What is claimed is:

1. A system for tuning and optimizing an advertisement placement engine by simulation, comprising:
   a memory storing a query log containing queries received from the advertisement placement engine; and
   one or more processors in communication with the memory, the one or more processors being configured to:
      select a set of queries from the query log, each query having at least one keyword and at least one parameter value;
      run a search simulation for each query from the set of queries using the at least one keyword and the at least one parameter value;
      determine a bid value and rank for each query based on the search simulation;
      compute an expected cost per click for each query based on the bid value, the rank, and a click probability provided in a click through prediction model.

2. The system of claim 1, wherein the set of queries is selected by applying a filter for a product line on the query log.

3. The system of claim 2, wherein the queries in the query log is streamed from a production engine into the system.

4. The system of claim 1, wherein the one or more processors is further configured to modify the at least one parameter values before transmitting the set of queries to the advertisement placement engine.

5. The system of claim 1, wherein the one or more processors is further configured to perform the steps of:
   running the search simulation for each query from the set of queries with a second parameter value;
   determining a second bid value; and
   compute a second expected cost per click for each query based on the second parameter value.

6. The system of claim 1, wherein the click probability is determined from click data generated by a production engine.

7. The system of claim 1, wherein the one or more processors is further configured to calculate an average revenue per impression per query based on the bid value, the rank, and the click probability provided in the click through prediction model.

8. A method of tuning and optimizing an advertisement placement engine, performed by a hardware simulator, the method comprising:
   selecting a set of simulation queries from a query log containing queries received from an advertisement placement engine, each query in the set of simulation queries comprising a keyword and a parameter value;
   transmitting the set of simulation queries to the advertisement placement engine;
   receiving a response to the transmitted set of queries from the advertisement placement engine, the response comprising a bid value and a rank for each query in the set of simulation queries based on the keyword and the parameter value; and
   computing an expected cost per click for each query in the set of simulation queries based on the bid value, the rank, and a click probability determined by a click through prediction model.

9. The method of claim 8, wherein the set of simulation queries is selected by applying a filter for a product line on the query log.

10. The method of claim 9, wherein the set of queries is streamed from the advertisement engine into the simulator.

11. The method of claim 8, further comprising modifying the parameter values before transmitting the set of simulation queries to the advertisement placement engine.

12. The method of claim 8, further comprising the steps of:
   transmitting a second set of simulation queries with a second parameter value to the advertisement placement engine;
   receiving a second response from the advertisement placement engine; and
   computing a second expected cost per click for each query in the second set of simulation queries based on the second parameter value.

13. The method of claim 8, wherein the prediction model is generated from click data generated by a production engine.

14. The method of claim 8, wherein the set of summary metric includes an average expected cost per click (CPC) per query and an average revenue per impression per query.

15. A non-transitory machine-readable medium comprising a plurality of machine-readable instructions which, when executed by one or more processors of a simulator, are adapted to cause the simulator to perform a method comprising:
   selecting a set of simulation queries, each query in the set of simulation queries including a keyword and a parameter value;
   transmitting the set of simulation queries to an advertisement placement engine for simulation;
   receiving simulation results for the set of simulation queries from the advertisement placement engine, the simulation results including a bid value and a rank for each query in the set of simulation queries based on the keyword and the parameter value; and
   computing an expected cost per click for each query in the set of simulation queries based on the bid value, the rank, and a click probability determined by a click through prediction model.

16. The non-transitory machine-readable medium of claim 15, wherein the set of simulation queries is selected by filtering a set of queries for a product line.

17. The non-transitory machine-readable medium of claim 16, wherein the set of queries is streamed from a production engine into the simulator.

18. The non-transitory machine-readable medium of claim 15, further comprising modifying the parameter values of each query in the set of simulation queries before transmitting the simulation queries to the advertisement placement engine.

19. The non-transitory machine-readable medium of claim 15, further comprising repeating the steps of:
   transmitting the set of simulation queries;
   receiving simulation results; and
   computing a second expected cost per click for each query based on another parameter value.

20. The non-transitory machine-readable medium of claim 15, wherein the prediction model is generated from click data generated by a production engine.

21. The non-transitory machine-readable medium of claim 15, wherein the summary metric includes an average expected cost per click (CPC) per query and an average revenue per impression per query.

* * * * *